(12) United States Patent
Sato et al.

(10) Patent No.: US 9,514,070 B2
(45) Date of Patent: *Dec. 6, 2016

(54) DEBUG CONTROL CIRCUIT

(71) Applicant: Cypress Semiconductor Corporation, San Jose, CA (US)

(72) Inventors: Shuheui Sato, Yokohama (JP); Takashi Sato, Yokohama (JP)

(73) Assignee: Cypress Semiconductor Corporation, San Jose, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/218,169

(22) Filed: Mar. 18, 2014

(65) Prior Publication Data

US 2014/0201403 A1 Jul. 17, 2014

Related U.S. Application Data

(63) Continuation of application No. 12/729,864, filed on Mar. 23, 2010, now Pat. No. 8,745,446.

(30) Foreign Application Priority Data

Mar. 25, 2009 (JP) ................................ 2009-074359

(51) Int. Cl.
*G06F 11/00* (2006.01)
*G06F 13/28* (2006.01)
*G06F 11/36* (2006.01)

(52) U.S. Cl.
CPC ............. *G06F 13/28* (2013.01); *G06F 11/362* (2013.01); *G06F 11/3648* (2013.01)

(58) Field of Classification Search
CPC .... G06F 13/28; G06F 11/362; G06F 11/3644; G06F 11/3648
See application file for complete search history.

(56) References Cited

U.S. PATENT DOCUMENTS

| 5,590,354 A | 12/1996 | Klapproth et al. |
| 6,647,545 B1 | 11/2003 | Kurts et al. |
| 7,574,585 B1 | 8/2009 | Nekl et al. |
| 7,665,002 B1 | 2/2010 | White et al. |

(Continued)

FOREIGN PATENT DOCUMENTS

| JP | 7-191877 A | 7/1995 |
| JP | 8-263428 A | 10/1996 |

(Continued)

OTHER PUBLICATIONS

English Language Abstract of Japanese Patent Publication No. 7-191877-A.

(Continued)

*Primary Examiner* — Michael Maskulinski

(57) ABSTRACT

A method and apparatus store a command in a command register and set, with a control circuit, a first operation mode associated with a split transaction for freeing a bus in a time period between a command transfer request and a command transfer operation. The method and apparatus set, with the control circuit, a second operation mode in which a split transaction is not issued and transfer, with the control circuit, the command to a processing unit via the bus in response to the command transfer request when in the second operation mode where after the processing unit executes the command and issues a subsequent command transfer request to the control circuit, the control circuit performs the split transaction when in the first and second operation modes.

20 Claims, 16 Drawing Sheets

(56) References Cited

U.S. PATENT DOCUMENTS

| | | |
|---|---|---|
| 7,769,934 B1 | 8/2010 | Pritchard et al. |
| 2005/0027973 A1 | 2/2005 | Barry et al. |
| 2006/0294343 A1 | 12/2006 | Rejmaniak |
| 2007/0220337 A1 | 9/2007 | Itoh et al. |
| 2010/0095154 A1 | 4/2010 | Shih et al. |
| 2010/0262811 A1 | 10/2010 | Moyer et al. |

FOREIGN PATENT DOCUMENTS

| | | |
|---|---|---|
| JP | 9-305536 A | 11/1997 |
| JP | 2001-273167 A | 10/2001 |
| JP | 2004-86447 A | 3/2004 |
| JP | 2004086447 A | 3/2004 |
| JP | 540443 B2 | 11/2013 |

OTHER PUBLICATIONS

English Language Abstract of Japanese Patent Publication No. 2004-86447-A.
English Language Abstract of Japanese Patent Publication No. 8-263428-A.
English Language Abstract of Japanese Patent Publication No. 9-305536-A.
English Language Abstract of Japanese Patent Publication No. 2001-273167-A.
English Language Abstract of Japanese Patent No. 5400443-B2.
Non-Final Office Action mailed Jul. 25, 2011 in U.S. Appl. No. 12/729,864.
Final Office Action mailed Jan. 13, 2012 in U.S. Appl. No. 12/729,864.
Non-Final Office Action mailed Mar. 29, 2013 in U.S. Appl. No. 12/729,864.
Notice of Allowance mailed Aug. 16, 2013 in U.S. Appl. No. 12/729,864.
Notice of Allowance mailed Dec. 20, 2013 in U.S. Appl. No. 12/729,864.
Oscar Camacho and Eduardo Viramontes, "Designing Touch Sensing Electrodes Electrical Considerations and Recommended Layout Patterns" NXP Freescale Semiconductor, Rev. 4, Jul. 2011; 28 pages.

DEBUG CONTROL CIRCUIT

CROSS-REFERENCE TO RELATED APPLICATIONS

This application is a continuation of U.S. patent application Ser. No. 12/729,864, filed Mar. 23, 2010, now allowed, which is based upon and claims the benefit of priority from the prior Japanese Patent Application No. 2009-74359,filed on Mar. 25, 2009, all of which are herein incorporated by reference in their entireties.

BACKGROUND

1. Field

The present invention generally relates to an integrated circuit and, more particularly, relates to a debugging circuit for checking the correctness of programs and an integrated circuit including the debugging circuit.

2. Description of Related Art

In semiconductor devices in which a central processing unit (CPU), such as a micro controller unit (MCU), is mounted, when programs to be executed by a CPU are to be developed, a debugging system is used. The debugging system supports debugging operations by displaying information regarding CPU operations that execute a program to be developed and by providing functions of performing specific operations on a program to be developed.

FIG. 1 illustrates an example of the configuration of a debugging system. A debugging system 10 includes a semiconductor device 11, such as an MCU, an external debugging device 12, and a host computer 13. The semiconductor device 11 is a device for which debugging is performed, and includes a CPU 21, a debugging circuit 22, a RAM 23, a ROM 24, a peripheral circuit 25, and an internal bus 26. The CPU 21 executes programs stored in the RAM 23 and the ROM 24. The CPU 21 appropriately accesses the RAM 23 as necessary when a program is executed, and uses the RAM 23 as a work area. The CPU 21 is connected to the debugging circuit 22, and supplies various kinds of execution history information to the debugging circuit 22. Furthermore, the debugging circuit 22 controls the operation of the CPU 21 based on a breakpoint and causes the CPU 21 to execute a debugging program in a debugging state after the break, thereby implementing a desired debugging function.

The external debugging device 12 is connected to the debugging circuit 22 via a debugging terminal 28, and functions as an interface between the debugging circuit 22 and the host computer 13. In the host computer 13, debugger software 15 is executed. A user performs debugging operations on programs to be executed by the CPU 21 of the semiconductor device 11 by operating the debugger software 15 using the host computer 13.

In recent years, some debugging circuits have been incorporated into mass-produced products in response to a request of wanting to perform debugging operations after shipment from factory. Japanese Unexamined Patent Application Publication No. 2001-273167 discloses a hardware break circuit used for debugging, which is incorporated inside a processor so that it can be used as a cache memory after debugging is completed.

Furthermore, there has been another demand of wanting to perform tuning of parameters of programs by using the debugger software 15 while the CPU 21 is executing a program. In order to perform such tuning in parallel with program execution by the CPU 21, it is desirable that the RAM 23 inside the semiconductor device 11 can be directly accessed from the debugging circuit 22 controlled by the debugger software 15 without the intervention of the CPU 21. In a configuration in which the debugging circuit 22 can directly access the resources inside the semiconductor device 11 in the above-described manner, there is a possibility that bus right acquiring requests collide between the debugging circuit 22 and the CPU 21. Therefore, it is desired that a bus right acquiring request and approval thereof are controlled so that the bus can be efficiently used.

In Japanese Laid-Open Patent Publication Nos. 8-263428 and 9-305536, an information processing apparatus in which a split transfer method is applied, and a bus arbitration method for use in the information processing apparatus are disclosed with respect to information equipment in which data input/output is performed via a bus.

SUMMARY

According to an aspect of the embodiment, an integrated circuit includes a bus; a processing unit configured to execute a user program; and a debugging circuit connected to the bus, the debugging circuit transferring a command in a command register to the processing unit via the bus in response to a command transfer request from the processing unit, wherein, when the processing unit halts the execution of the user program and makes a request for the command transfer request to the debugging circuit, the debugging circuit makes a response for freeing the use right of the bus from the processing unit in a period between the command transfer request and the command transfer operation.

The object and advantages of the invention will be realized and attained by means of the elements and combinations particularly pointed out in the claims.

It is to be understood that both the foregoing genera description and the following detailed description are exemplary and explanatory and are not restrictive of the invention, as claimed.

DESCRIPTION OF THE PREFERRED EMBODIMENTS

Embodiments of the present invention will be described in detail below.

In order to directly access a RAM inside a semiconductor device from a debugging circuit controlled by debugger software, the debugging circuit may be connected to an internal bus, and a bus master, such as a direct memory access controller (DMAC), may be mounted in the debugging circuit. By controlling the DMAC of the debugging circuit using external debugger software, it is possible to directly perform a data access operation for internal resources, such as a RAM, without the intervention of a CPU. As a result, in parallel with the execution of a program by the CPU, it is possible to correct various parameters stored in the RAM so as to perform tuning of operation performance.

When, as described above, the debugging circuit is connected to the internal bus, and data and commands are exchanged with the resources inside the semiconductor device via the internal bus, there is a possibility that bus right acquiring requests collide between the debugging circuit and the CPU. Therefore, it is desired that the bus right acquiring request and approval thereof are controlled so that the bus may be used efficiently. A situation in which a collision of bus right acquiring requests occurs will be described below.

Figure 1:
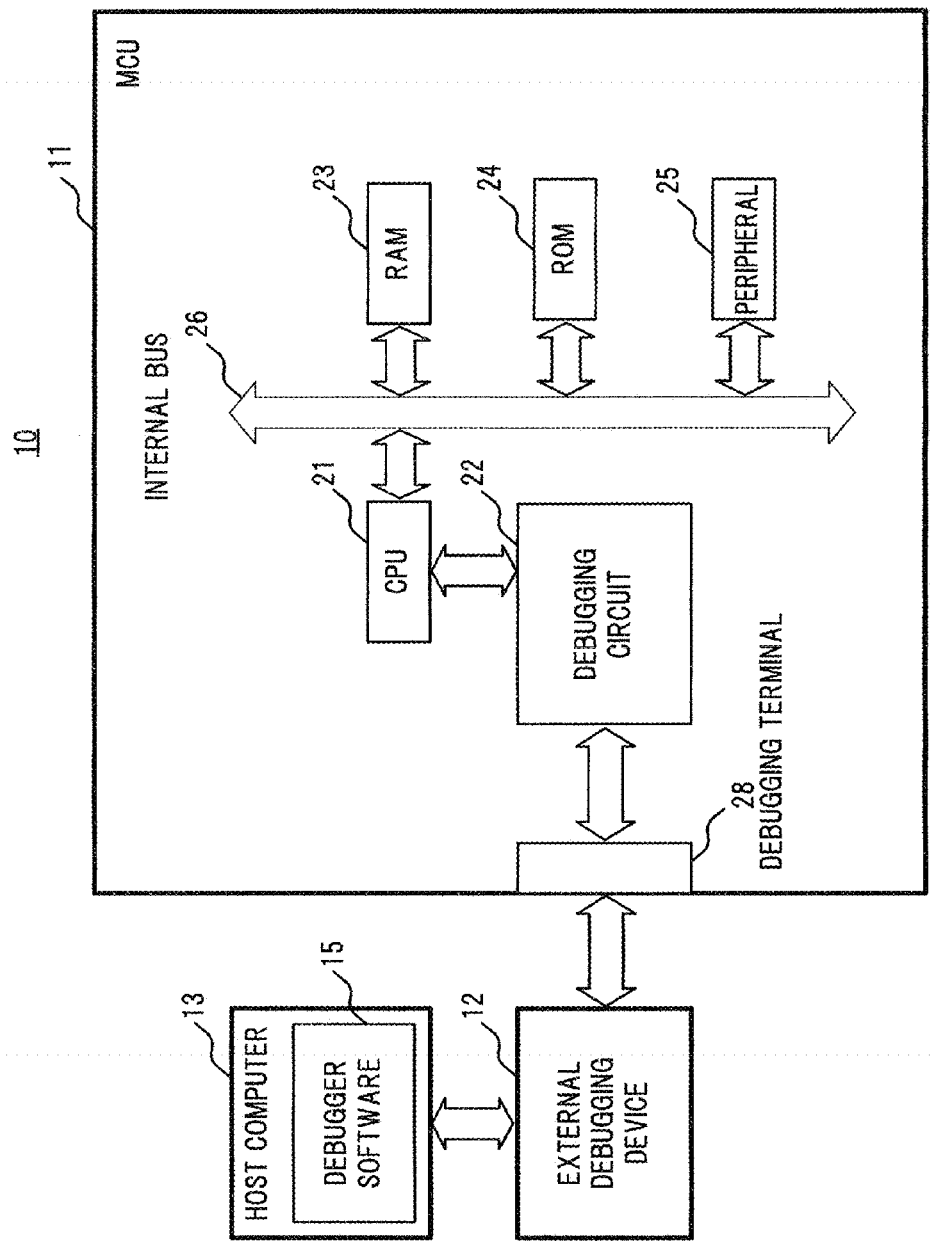
FIG. 1 illustrates an example of the configuration of a debugging system.

Program debugging using a debugging system illustrated in FIG. 1 of the related art is performed in accordance with, for example, the following flow. When it is determined that the command that has been set in advance as a break factor is executed while the program is being executed, the CPU 21 performs a break process so as to halt the execution of the program. This state in which the execution of the program is halted is referred to as a debugging state. In this debugging state, information to debug a program is obtained from the debugging circuit 22 by the debugger software 15 executed on the host computer 13 outside the chip. After that, the execution of the halted program is restarted in accordance with an instruction from the debugger software 15. Debugging is performed in a similar manner as that for the subsequent program operations.

In the debugging state after the break, the debugger software 15 of the host computer 13 performs the control of debugging operation. The CPU 21 in the debugging state executes a desired debugging command in the monitor program specified by the debugger software 15 at a desired timing. Here, the monitor program refers to a debugging program executed by the CPU 21 in the debugging state, and the desired debugging command refers to a command string that begins from a specific address in the monitor program. Furthermore, the desired timing refers to a timing indicated by the debugger software 15 of the host computer 13.

Figure 2:
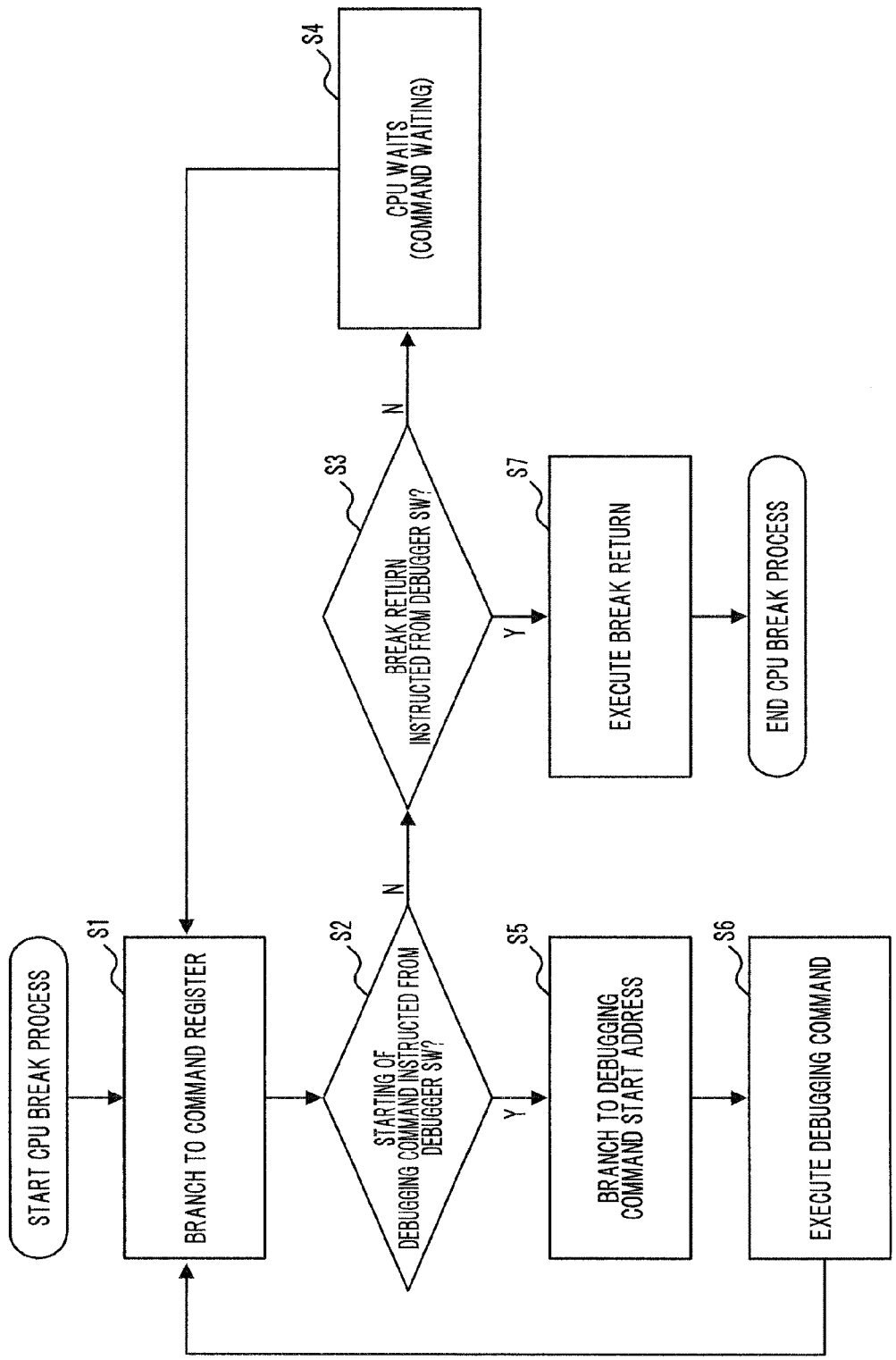
FIG. 2 is a flowchart illustrating the flow of a break process of a CPU.

FIG. 2 is a flowchart illustrating the flow of a break process of the CPU 21. When a break occurs, the CPU 21 branches to a specific address exclusively used for a break (S1). A register for storing commands inside the debugging circuit 22 (hereinafter referred to as a command register) is assigned to the specific address. From this command register, a command for causing the CPU 21 to wait, a command for branching to a desired debugging command start address, a break return command for returning from a debugging state to user program execution, and other commands are read. From the command register, a command sequence of causing the CPU 21 to wait in the initial state is read (NO in S2 and S3), and the CPU 21 enters a wait state (S4). In this wait state, the CPU 21 performs no substantial operation since a NOP (No Operation) command is performed, and returns to the beginning address of the command register of S1 in the loop. The CPU 21 repeats the execution of the NOP command inside the command register and the loop.

When the debugger software 15 specifies the start address of the debugging command and gives a debugging command start instruction to the debugging circuit 22, the command read from the command register is switched to a debugging command start instruction command (command for branching to a debugging command start address) (YES in S2). The CPU 21 branches to the debugging command start address (S5), and performs the debugging command (56). As a debugging command completion process, the CPU 21 branches to a specific address (the command register) exclusively used for a break (S1). Furthermore, when the debugger software 15 gives an instruction of a break return to the debugging circuit 22, the command read from the command register is switched to a break return command (command for branching to the breakpoint in the user program) (YES in S3). The CPU 21 performs the break return command (S7), and completes the break process.

Figure 3:
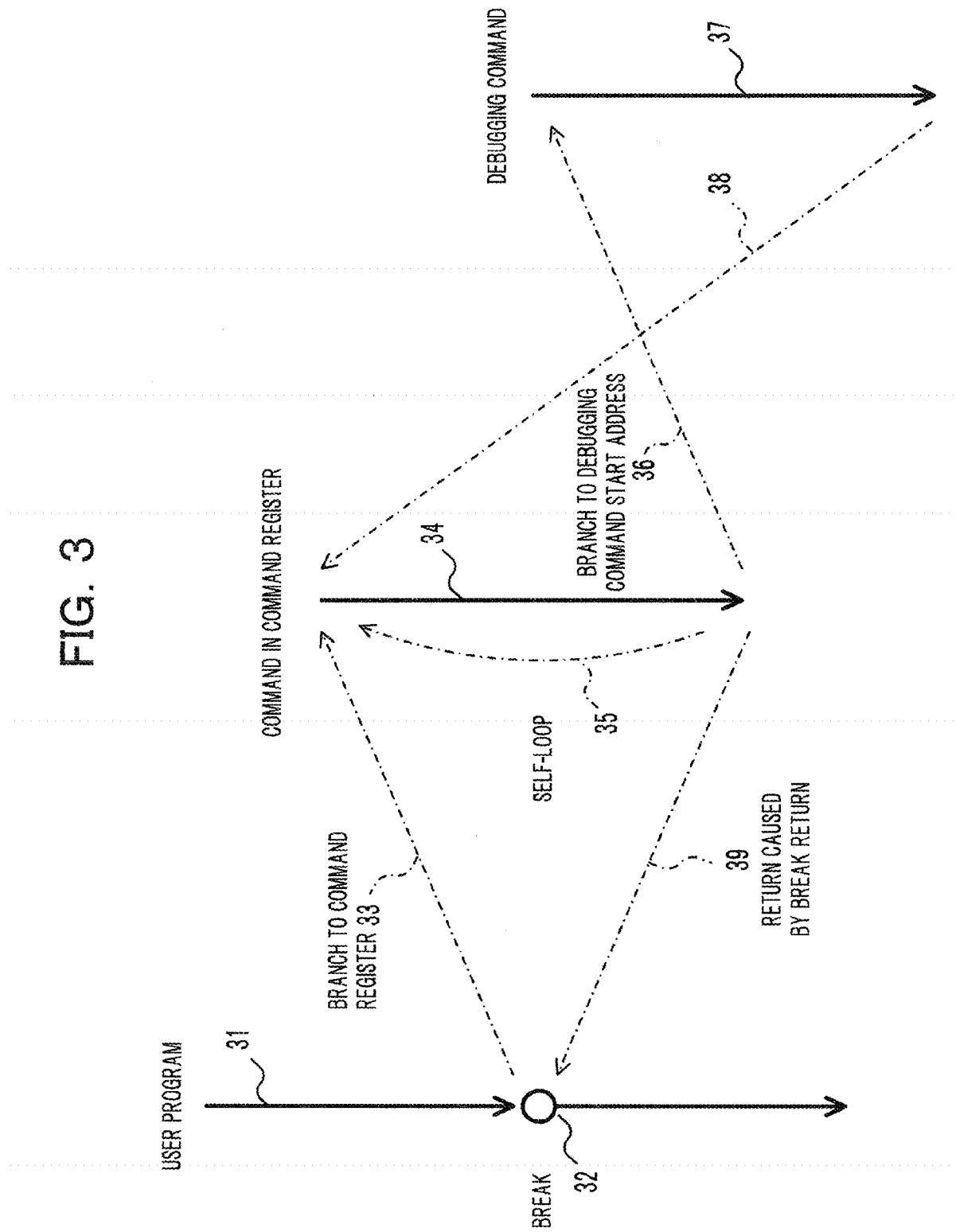
FIG. 3 illustrates user program execution and command execution in a debugging state.

FIG. 3 illustrates user program execution and command execution in a debugging state. When the execution 31 of the user program by the CPU 21 reaches a breakpoint 32, a branch 33 to the command register occurs. The execution 34 of the command inside the command register by the CPU 21 is performed. In the case of a wait command, the self-loop 35 causes the execution 34 of the command inside the command register to be repeated. When the command inside the command register is a debugging command start instruction command, a branch 36 to the debugging command start address occurs, and the execution 37 of the debugging command is performed by the CPU 21. When the execution 37 of the debugging command is completed, a branch (return) 38 to the command register occurs. When the command inside the command register is a break return command, a return 39 caused by the break return occurs, and the execution 31 of the user program after the breakpoint 32 is performed.

In the case of a configuration in which the debugging circuit 22 illustrated in FIG. 1 is connected to the internal bus 26 and data and commands are exchanged with the resources inside the semiconductor device 11 via an internal bus 26, a problem occurs regarding the use of the bus. That is, when the CPU 21 repeats the execution of the NOP command inside the command register of the debugging circuit 22 and the loop in the above-described manner, during the time, the CPU 21 occupies the internal bus 26. As a result, it becomes difficult for the bus master having a lower priority than the CPU 21 in the interna bus 26 to acquire a bus right. For example, even if a DMAC is incorporated in the debugging circuit 22 so that the DMAC may be controlled from the debugger software 15, in the command wait state of the CPU 21, the DMAC may not use the internal bus 26. In order to be able to use the internal bus 26, it is desirable to take measures, such as forcibly increasing the bus priority of the DMAC. Therefore, there is a desire for a configuration in which the command wait state of the CPU in the debugging state is realized without occupying the bus.

Figure 4:
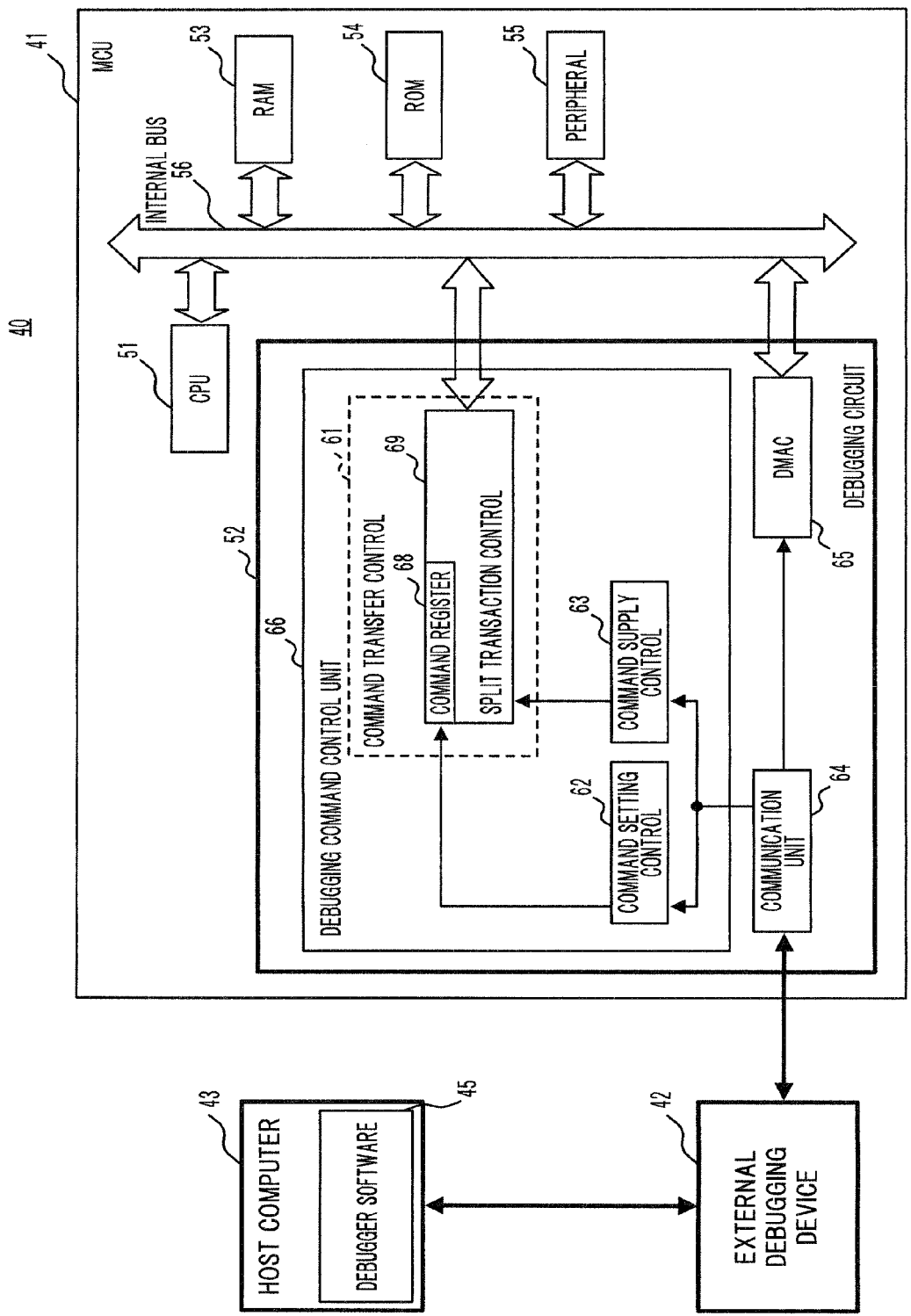
FIG. 4 illustrates an example of the configuration of a debugging system in which a debugging circuit is connected to an internal bus.

FIG. 4 illustrates an example of the configuration of a debugging system in which a debugging circuit is connected to an internal bus. A debugging system 40 includes a semiconductor device 41, such as an MCU, an external debugging device 42, and a host computer 43. The semiconductor device 41 is a device for which debugging is performed, and includes a CPU 51, a debugging circuit 52, a RAM 53, a ROM 54, a peripheral circuit 55, and an internal bus 56. The CPU 51 executes programs stored in the RAM 53 and the ROM 54. The CPU 51 appropriately accesses the RAM 53 when a program is executed, and uses the RAM 53 as a work area. The CPU 51 supplies execution history information to the debugging circuit 52. Furthermore, the debugging circuit 52 controls the operation of the CPU 51 based on a breakpoint, and causes the CPU 51 to execute a debugging program in a debugging state after the break, thereby implementing a desired debugging function.

The external debugging device 42 is connected to the debugging circuit 52, and functions as an interface between the debugging circuit 52 and the host computer 43. In the host computer 43, debugger software 45 is being executed. The user performs debugging operations of a program executed by the CPU 51 of the semiconductor device 41 by operating the debugger software 45 using the host computer 43.

The debugging circuit 52 includes a command transfer control unit 61, a command setting control unit 62, a command supply control unit 63, communication unit 64, and a DMAC 65. The command transfer control unit 61 includes a command register 68 and a split transaction control unit 69. The command transfer control unit 61, the command setting control unit 62, and the command supply control unit 63 make up a debugging command control unit 66.

The communication unit 64 communicates with the host computer 43 via the external debugging device 42. The DMAC 65 is controlled by the debugger software 45 via the communication unit 64, and has a function of read/write accessing internal resources, such as a RAM 53, via an internal bus 56 in response to this external control. Monitoring (monitoring of register values and memory values by read process) and tuning (rewriting of register values and memory values by write process) in real time of the debug target system by the debugger software 45 become possible.

The command setting control unit 62 stores a command in the command register 68 in response to an instruction from the debugger software 45 via the communication unit 64. For example, a break return command, a command for branching to a debugging command start address, and the like are stored in the command register 68. In response to a command transfer request from the CPU 51, the command transfer control unit 61 transfers the command of the command register 68 to the CPU 51 via the internal bus 56. That is, when the CPU 51 halts the execution of the user program execution of the program and makes a command transfer request to the debugging circuit 52, the command transfer control unit 61 sends the command of the command register 68 to the internal bus 56. The CPU 51 may execute various debugging commands in a debugging state by reading and executing the command sent to the internal bus 56 by the command transfer control unit 61.

In the semiconductor device 41 illustrated in FIG. 4, when the CPU 51 breaks at a breakpoint while the user program is being executed and issues a command transfer request to the debugging circuit 52, a split transaction is performed. This split transaction refers to a transaction in which a data transfer request operation and an actual data transfer operation among the series of operations forming the data transfer process are split. Here, the fact that two operations are split indicates that another device such as the DMAC 65, or the CPU 51 may perform another transaction via the internal bus 56 in a period between the two operations. That is, the command transfer control unit 61 makes a split response that causes the use right of the internal bus 56 to be freed from the CPU 51 in a period between the command transfer request and the command transfer operation. The split transaction control unit 69 governs the control of this split transaction. The command supply control unit 63 gives an instruction of the timing of the command supply to the split transaction control unit 69.

Figure 5:
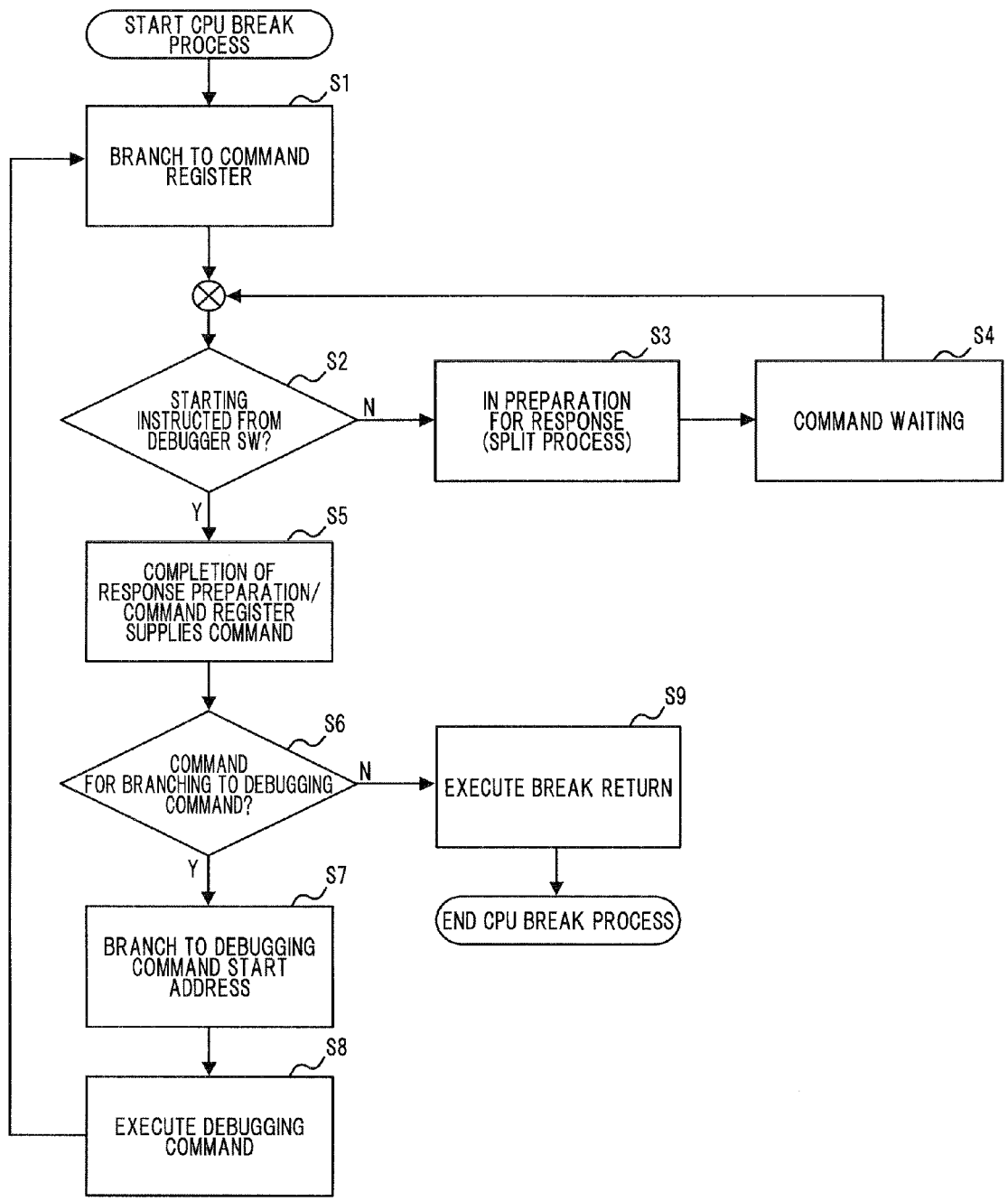
FIG. 5 is a flowchart illustrating the flow of a break process of a CPU.

FIG. 5 is a flowchart illustrating the flow of a break process of the CPU 51. When a break factor set in advance occurs while a program is being executed, the CPU 51 performs a break process. When the CPU 51 breaks, the CPU 51 saves program execution information (a program counter value, a status register value, etc.) at the time of the break in a saving register exclusively used for a break, and branches to the specific address exclusively used for a break. That is, the CPU 51 branches to a command register 68 assigned to a specific address exclusively used for a break (S1). In the initial state, there is no start instruction from the debugger software 45 (NO in S2). Therefore, the split transaction control unit 69 notifies the bus system of the internal bus 56 and the CPU 51 that the split transaction control unit 69 is in preparation for a response so as to make a request for a split transaction of the internal bus 56 (S3). As a result, the CPU 51 frees the bus right, and enters a state of waiting for a command from the debugging circuit 52 (S4). p In response to the instruction from the debugger software 45, the command setting control unit 62 sets a desired command in the command register 68. After that, in response to the instruction from the debugger software 45, the command supply control unit 63 gives a debugging command start instruction to the split transaction control unit 69 (YES in S2). In response to this, the split transaction control unit 69 notifies the internal bus 56 of the response preparation completion, and supplies the command of the command register 68 to the CPU 51 via the internal bus 56 (S5).

When the supplied command is a command for branching to a debugging command start address (YES in S6), the CPU 51 branches to a debugging command start address (S7) and executes the debugging command (S8). As a debugging command completion process, the CPU 51 branches to the command register 68 (S1). When the supplied command is a break return command (NO in S6), the CPU 51 executes a break return command (S9), and the break process is completed.

Figure 6:
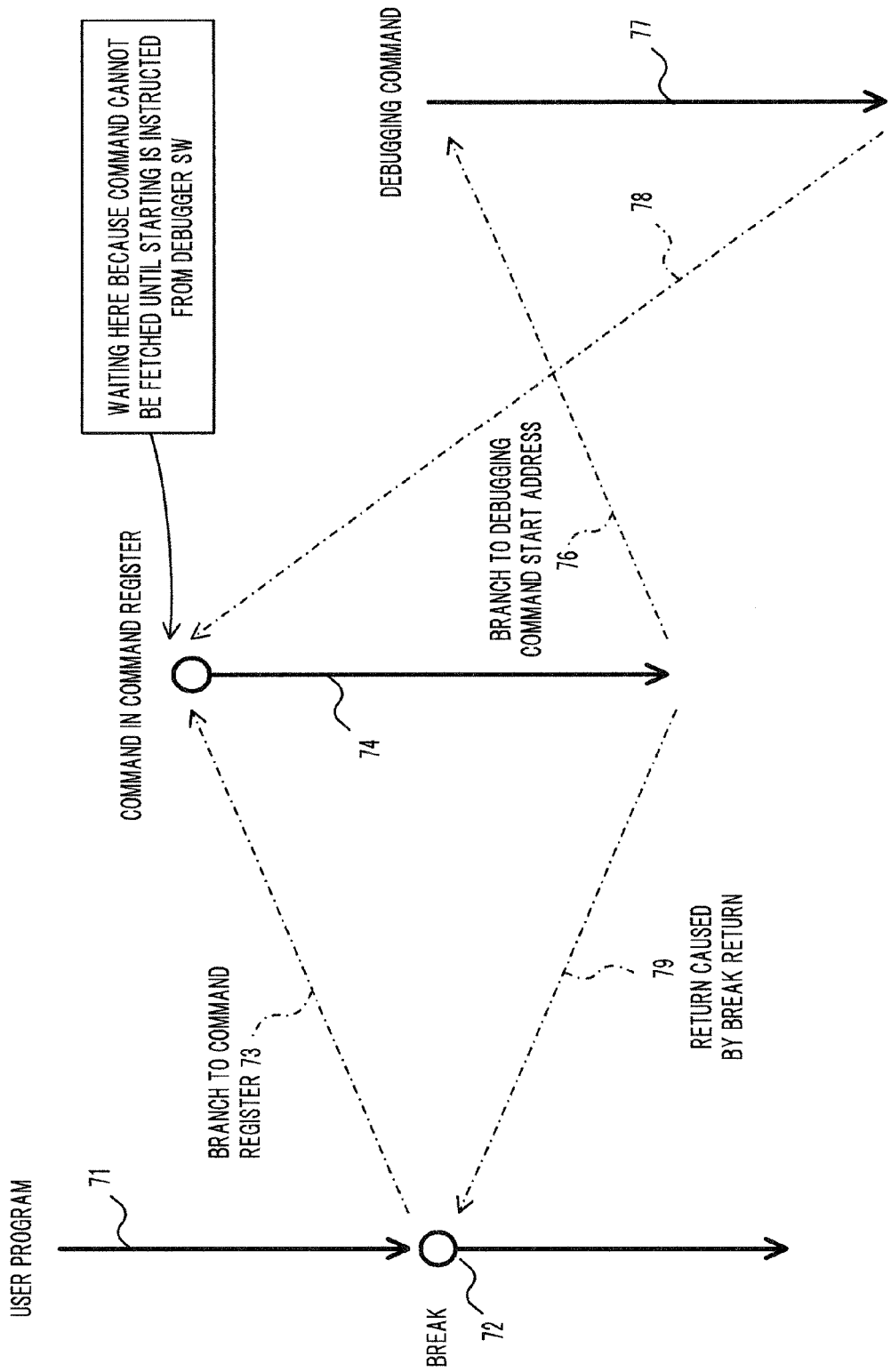
FIG. 6 illustrates user program execution and command execution in a debugging state.

FIG. 6 illustrates user program execution and command execution in a debugging state. When the execution 71 of the user program by the CPU 51 reaches a breakpoint 72, a branch 73 to the command register occurs. Since the command transfer control unit 61 of the debugging circuit 52 indicates that the command transfer control unit 61 is in preparation for a response with respect to a request for fetching a command from the command register, the CPU 51 does not fetch the command, frees the bus right, and enters a wait state. Thereafter, when the command transfer control unit 61 of the debugging circuit 52 indicates the response preparation completion, the CPU 51 fetches a command, and the execution 74 of the command in the command register is performed by the CPU 51. When the command in the command register is a debugging command start instruction command, a branch 76 to the debugging command start address occurs, and the execution 77 of the debugging command is performed by the CPU 51. When the execution 77 of the debugging command is completed, a branch (return) 78 to the command register occurs. When the command in the command register is a break return command, a return 79 caused by the break return occurs, and the execution 71 of the user programs at and subsequent to a breakpoint 72 is performed.

Figure 7:
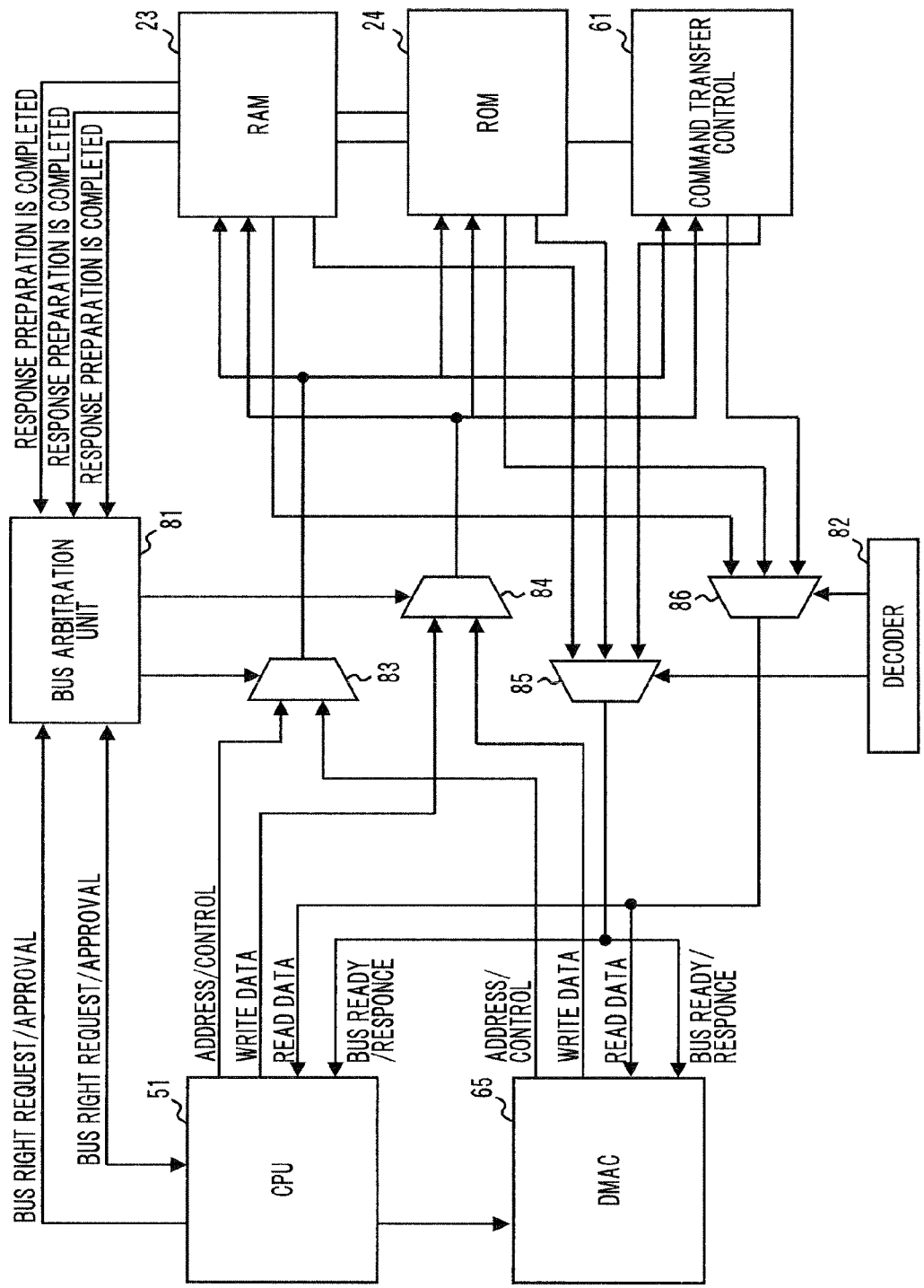
FIG. 7 illustrates an example of a bus system configuration of an internal bus.

FIG. 7 illustrates an example of the bus system configuration of the internal bus 56. A bus system illustrated in FIG. 7 includes a bus arbitration unit 81, a decoder 82, and selectors 83 to 86. In order to perform data access to slave devices, such as the RAM 23 and the ROM 24, via the internal bus 56, first, the bus masters, such as the CPU 51 or the DMAC 65, make a bus right request to the bus arbitration unit 81. When the number of bus right requests is only one, the bus arbitration unit 81 asserts a bus right approval signal to the bus master that has made the bus right request. When there are bus right requests from a plurality of bus masters, the bus arbitration unit 81 selects the bus master to which a bus right is given through an arbitration process appropriate for a specific priority or the like, and asserts a bus right approval signal to the selected bus master. The bus master that has acquired the bus right accesses a desired slave device via selectors 83 and 84 that are controlled as appropriate by the bus arbitration unit 81. A bus ready/response signal is sent back from the slave device via the selectors 85 and 86 that are controlled as appropriate by the decoder 82 that decodes the address of the access destination, and sends back read data in the case of read access. Furthermore, each slave device supplies a signal that notifies the bus arbitration unit 81 of the response preparation completion.

Figure 8:
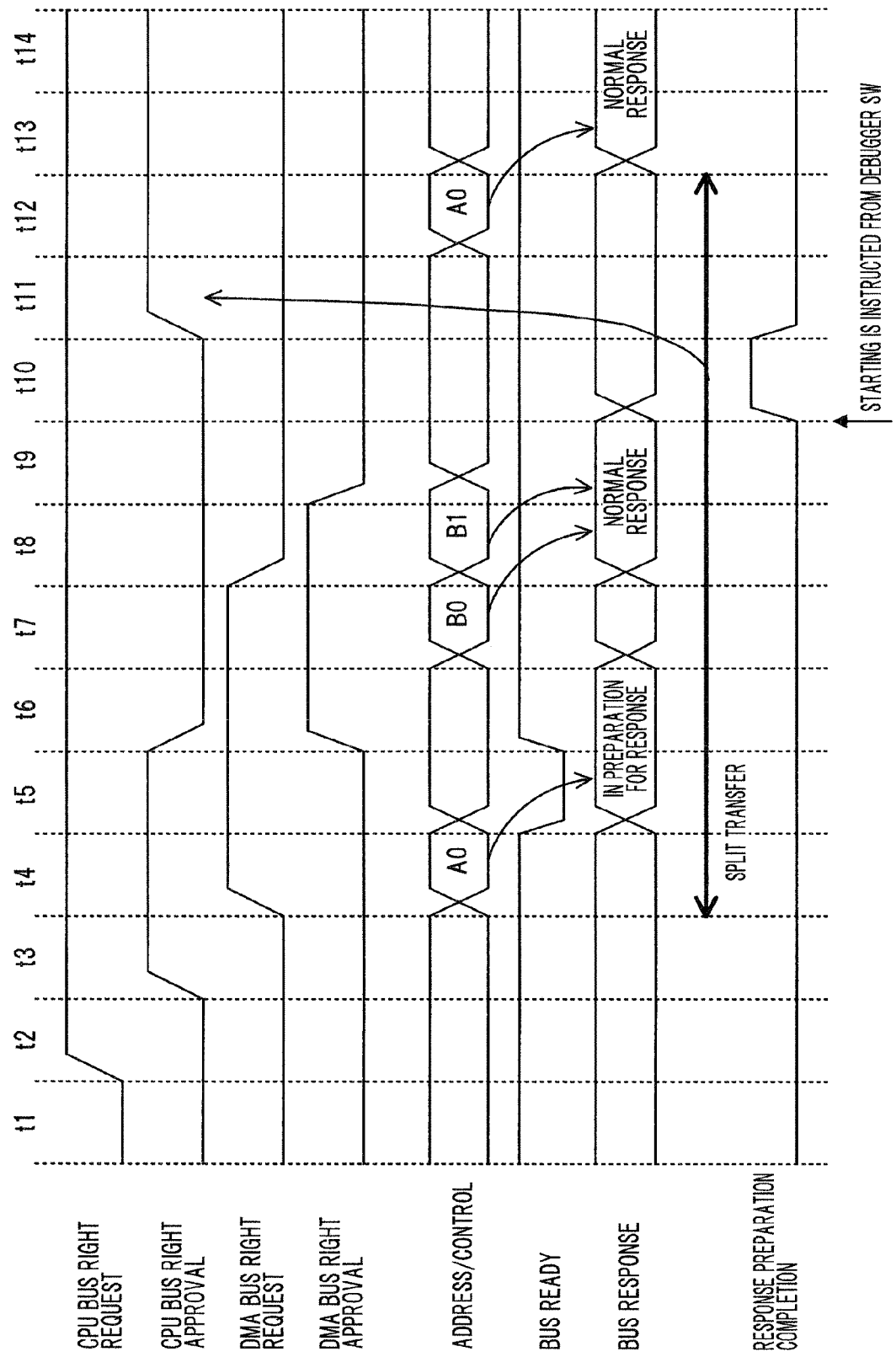
FIG. 8 illustrates an example of a split transaction performed by a command transfer control unit in the bus system illustrated in FIG. 7.

FIG. 8 illustrates an example of a split transaction performed by the command transfer control unit 61 in the bus system illustrated in FIG. 7. When a break factor occurs, in order to branch to the command register 68, the CPU 51 asserts the bus right request signal to be HIGH at t2. In response to this, at t3, the bus arbitration unit 81 asserts the bus right approval signal to be HIGH with respect to the CPU 51. The CPU 51 that has acquired the bus right sends the address A0 of the command register 68 to the address bus at t4 so as to request a command fetch (command transfer) for the command register 68. In response to this command transfer request, at t5, the split transaction control unit 69 of the command transfer control unit 61 causes the bus ready signal to be placed in a LOW state and sets the bus response signal to a value indicating being in preparation for a response. It is assumed here that the LOW state of the bus ready signal indicates deferring of a command transfer for the command transfer request. At t6, the bus arbitration unit 81 receives a notification of being in preparation for a response and withdraws the approval of the bus right to the CPU 51 (that is, the bus right approval signal is turned LOW). As a result, the internal bus 56 is able to be used by another bus master.

In the example of FIG. 8, at t4, the DMAC 65 asserts the bus right request signal to be HIGH. At t6, the bus arbitration unit 81 withdraws the bus right approval to the CPU 51 and asserts the bus right approval signal to be HIGH with respect to the DMAC 65. At t7 and t8, the DMAC 65 performs data access to addresses B0 and B1 via the internal bus 56.

When the split transaction control unit 69 receives a debugging command start instruction from the debugger software 45, at t10, the split transaction control unit 69 indicates the response preparation completion. In response to a signal that indicates the response preparation completion, at t1, the bus arbitration unit 81 approves the bus right once more for the CPU 51. When the CPU 51 acquires the bus right, at t12, the CPU 51 sends the address A0 of the command register 68 to the address bus, and makes a request for a command fetch (command transfer) for the command register 68. In response to this command transfer request, at t13, the split transaction control unit 69 of the command transfer control unit 61 transmits the command stored in the command register 68 to the CPU 51 via the internal bus 56.

Figure 9:
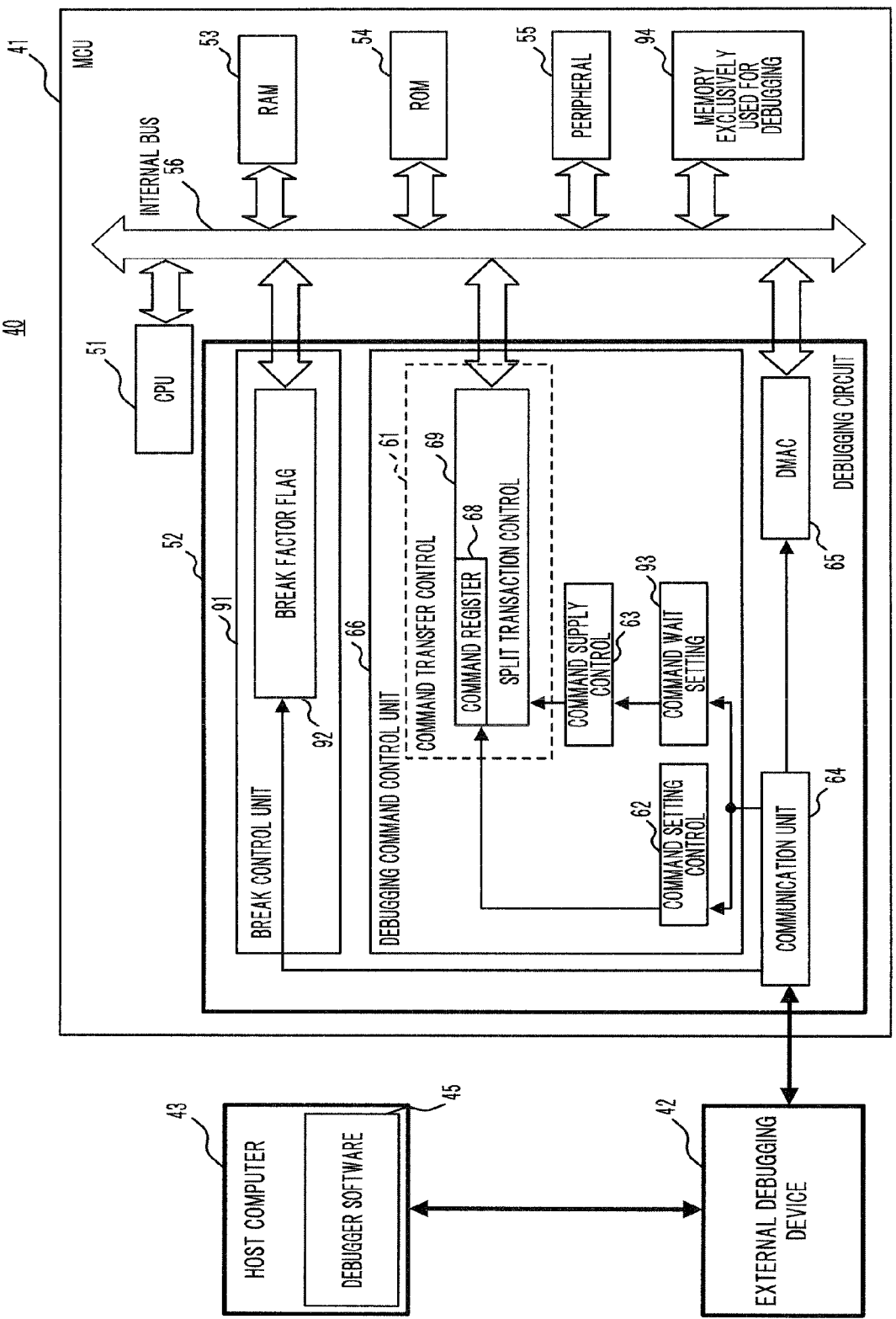
FIG. 9 illustrates a modification of the configuration of a debugging system in which a debugging circuit is connected to an internal bus.

FIG. 9 illustrates a modification of the configuration of a debugging system in which a debugging circuit is connected to an internal bus. Components illustrated in FIG. 9, which are similar to those illustrated in FIG. 4, are designated with the same reference numerals, and accordingly, detailed descriptions thereof are omitted. In the debugging system 40 of FIG. 9, the semiconductor device 41 is additionally provided with a memory 94 exclusively used for debugging. Furthermore, the debugging circuit 52 is additionally provided with a break control unit 91 and a command wait setting unit 93. The break control unit 91 includes a break factor flag 92.

Based on the instruction from the debugger software 45, the command wait setting unit 93 sets the command transfer control unit 61 in one of a first operation mode (command wait setting activation mode) and a second operation mode (command wait setting deactivation mode). In the first operation mode, a split transaction process is performed, and in the second operation mode, a split transaction process is not performed. In the debugging system 40 illustrated in FIG. 9, in the initial state, a command for branching to a specific address in the memory 94 exclusively used for debugging is stored in the command register 68 of the debugging circuit 52. When the command transfer control unit 61 is set in the second operation mode, in response to the command transfer request from the CPU 51 that performed a break, the command transfer control unit 61 immediately transfers the command for branching to the specific address stored in the command register 68 to the CPU 51. As a result, the CPU 51 is able to immediately execute the command of the memory 94 exclusively used for debugging without waiting for a response.

The CPU 51 may first confirm the content of the break factor flag 92 by executing the command of the memory 94 exclusively used for debugging. There may be a plurality of types of factors as factors for the CPU 51 to break. The break factor flag 92 has stored therein a value indicating which one of the plurality of types of factors the current break factor of the CPU 51 is. When the break factor flag 92 indicates a specific factor, the CPU 51 continues the execution of the command stored in the memory 94 exclusively used for debugging so as to be able to perform a process scheduled to be performed for the specific factor. When the break factor flag 92 indicates a factor that is not the specific factor, the CPU 51 may branch to the command register 68 once more. When, as described above, the CPU 51 branches to the command register 68 once more after the execution of the command that begins from the specific address of the memory 94 exclusively used for debugging, the command transfer control unit 61 performs a split transaction process even when the command transfer control unit 61 is set in the second operation mode.

With the above-described configuration, a pseudo on-the-fly process (a specific process that is performed at a break of a short period without needing a debugging command start instruction from the debugger software 45) is made possible. The pseudo on-the-fly process in the debugging system 40 of FIG. 9 will be described in more detail.

Figure 10:
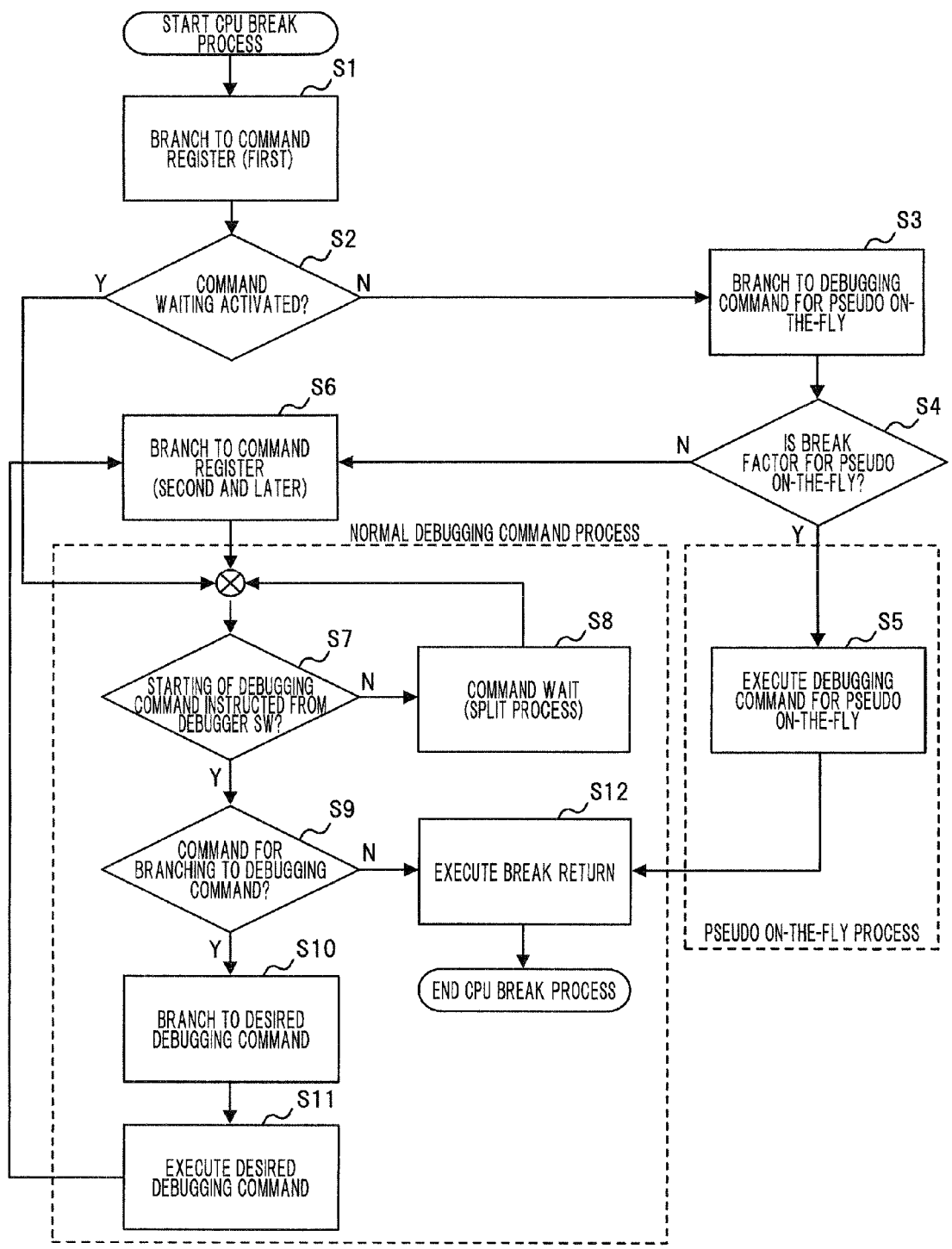
FIG. 10 is a flowchart of a debugging command control procedure including a pseudo on-the-fly process.

FIG. 10 is a flowchart of a debugging command control procedure including a pseudo on-the-fly process. When a break factor occurs while a program is being executed, the CPU 51 performs a break process. That is, the CPU 51 branches to the command register 68 assigned to the specific address exclusively used for a break (S1). In the command register 68, in the initial state, a command for branching to a specific address in the memory 94 exclusively used for debugging is stored, and a debugging command for a pseudo on-the-fly process is stored at this specific address. When the command wait setting is not activated (NO in S2), the CPU 51 immediately reads the command of the command register 68, and branches to the debugging command start address for the pseudo on-the-fly process (S3). In the execution of the debugging command for the pseudo on-the-fly process, initially, the CPU 51 confirms the break factor (S4). When the break factor is a pseudo on-the-fly break (YES in S4), the CPU 51 directly performs the debugging command for the pseudo on-the-fly process (S5). As the command completion process, the CPU 51 performs a break return command (S12), and the break process is completed. As a result, the pseudo on-the-fly process is realized.

When the break factor is not the pseudo on-the-fly break (NO in S4), the CPU 51 branches to the command register 68 once more (S6). At this point, the CPU 51 may branch to a desired corresponding debugging command rather than branching to the command register 68. When the CPU 51 branches to the command register 68 once more, in second and subsequent command fetches to the command register 68, command waiting becomes activated regardless of the operation mode. That is, in the initial state, there is no start instruction from the debugger software 45 (NO in S7). The split transaction control unit 69 notifies the bus system of the internal bus 56 and the CPU 51 of being in preparation for a response and makes a request for a split transaction of the internal bus 56 (S8). As a result, the CPU 51 frees the bus right and enters a state of waiting for a command from the debugging circuit 52.

Thereafter, the command setting control unit 62 sets a desired command in the command register 68 in response to the instruction from the debugger software 45. Furthermore, in response to the instruction from the debugger software 45, the command supply control unit 63 gives a debugging command start instruction to the split transaction control unit 69 (YES in S7). When the supplied command is a command for branching to the debugging command start address (YES in S9), the CPU 51 branches to a debugging command start address (S10), and executes a debugging command (S11). For the debugging command completion process, the CPU 51 branches to the command register 68 (S6). When the supplied command is a break return command (NO in S9), the CPU 51 executes a break return command (S12), and completes the break process.

Figure 11:
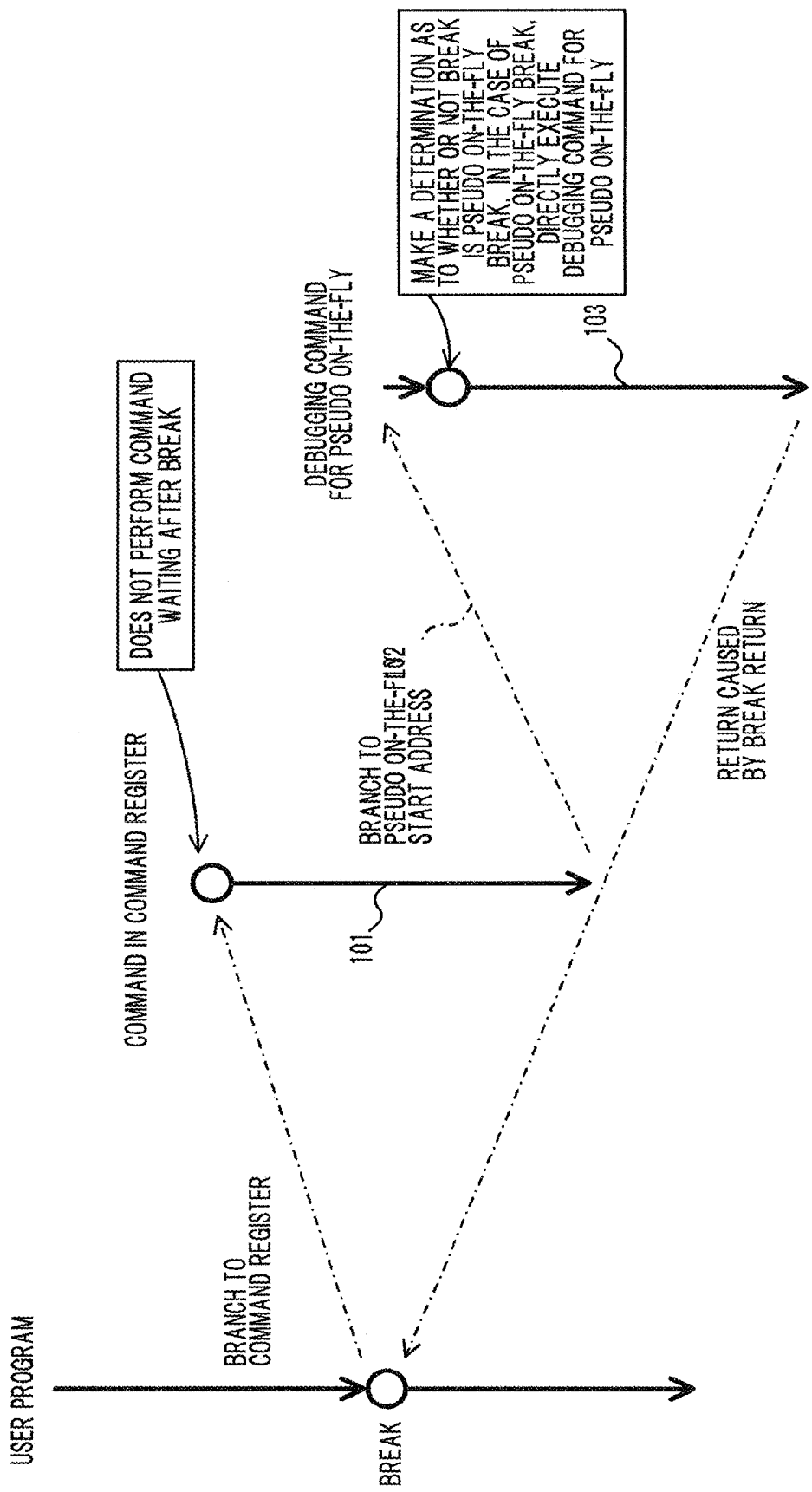
FIG. 11 illustrates the flow of command execution when a break factor is a pseudo on-the-fly break when command wait setting is deactivated.

FIG. 11 illustrates the flow of command execution when a break factor is a pseudo on-the-fly break when a command wait setting is deactivated. When the user program execution is halted due to a certain break factor, the CPU 51 immediately reads the command in the command register 68, and performs the execution 101 of the command in the command register. Since the command in the command register is a command for branching to the pseudo on-the-fly start address, a branch 102 to the pseudo on-the-fly start address occurs. In the execution of the debugging command for pseudo on-the-fly, when the break factor is found to be a pseudo on-the-fly break, the CPU 51 continues, as is, the execution 103 of the debugging command for pseudo on-the-fly. As a consequence of the execution 103 of the debugging command for pseudo on-the-fly, a return caused by the break return occurs, and execution of the user program at and subsequent to the break is performed.

Figure 12:
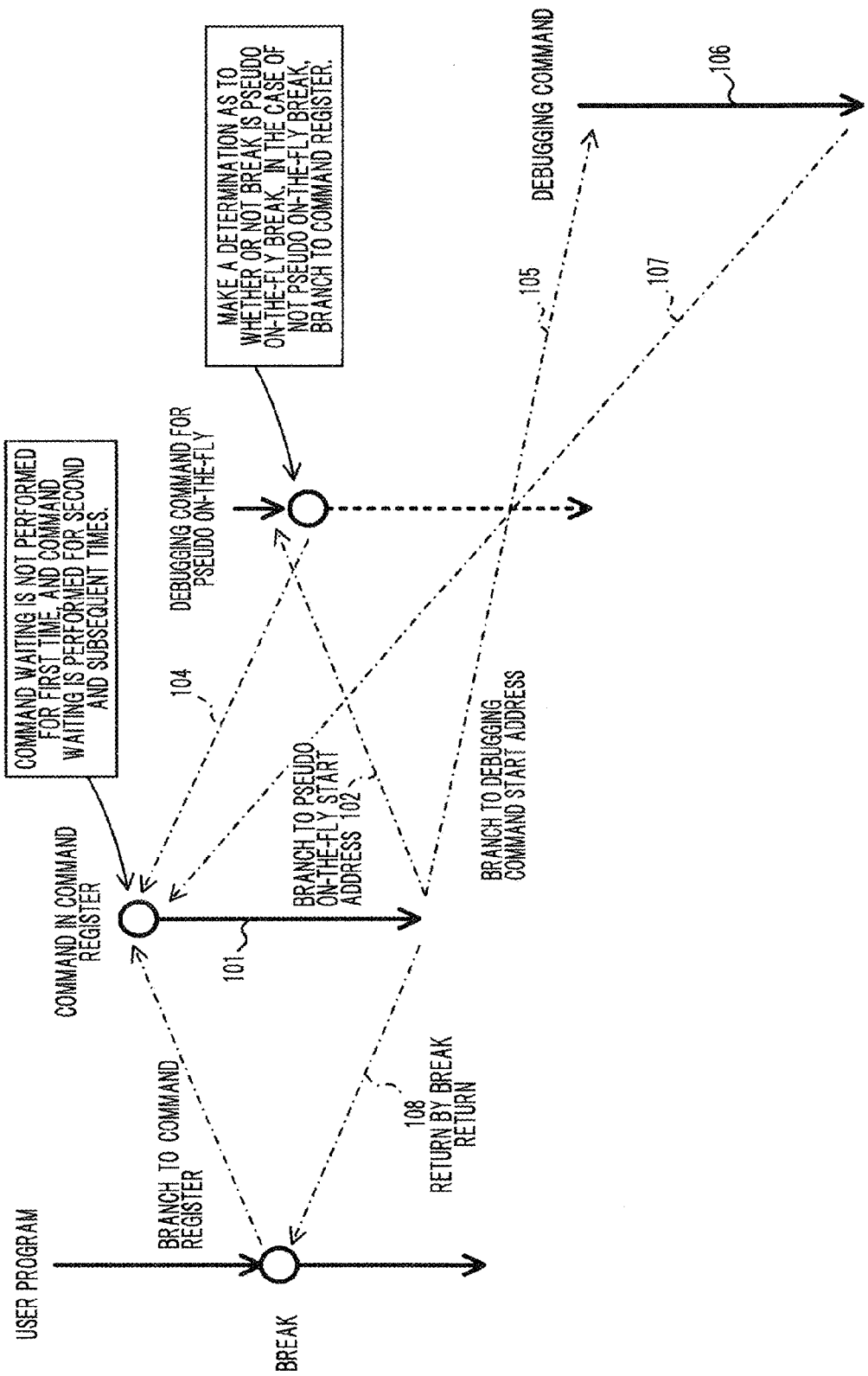
FIG. 12 illustrates a flow of command execution when a break factor is not a pseudo on-the-fly break when command wait setting is deactivated.

FIG. 12 illustrates a flow of command execution when a break factor is not a pseudo on-the-fly break when the command wait setting is deactivated. When the user program execution is halted due to a certain break factor, the CPU 51 immediately reads the command in the command register 68, and performs the execution 101 of the command in the command register. Since the command in the command register is a command for branching to a pseudo on-the-fly start address, a branch 102 to the pseudo on-the-fly start address occurs. In the execution of the debugging command for pseudo on-the-fly, when the break factor is found not to be a pseudo on-the-fly break, a branch 104 to the command register 68 occurs. The command transfer control unit 61 of the debugging circuit 52 indicates being in preparation for a response with respect to second and subsequent command fetch requests to the command register. Thus, the CPU 51 frees the bus right without fetching a command, and enters a wait state.

Thereafter, when the command transfer control unit 61 of the debugging circuit 52 indicates the response preparation completion, the CPU 51 fetches a command and performs the execution 101 of the command in the command register. When the command in the command register is a command for branching to the desired debugging command start address, a branch 105 to the debugging command start address occurs, and the CPU 51 performs the execution 106 of the debugging command. When the execution 106 of the debugging command is completed, the branch 107 (return) to the command register occurs once more. When the command in the command register is a break return command, a return 108 caused by the break return occurs, and the execution of the user program at and subsequent to the break is performed.

The debugging command control method described up to this point may also be applied to debugging command control when a reset is released. Debugging command control during reset release time will be described below.

Figure 13:
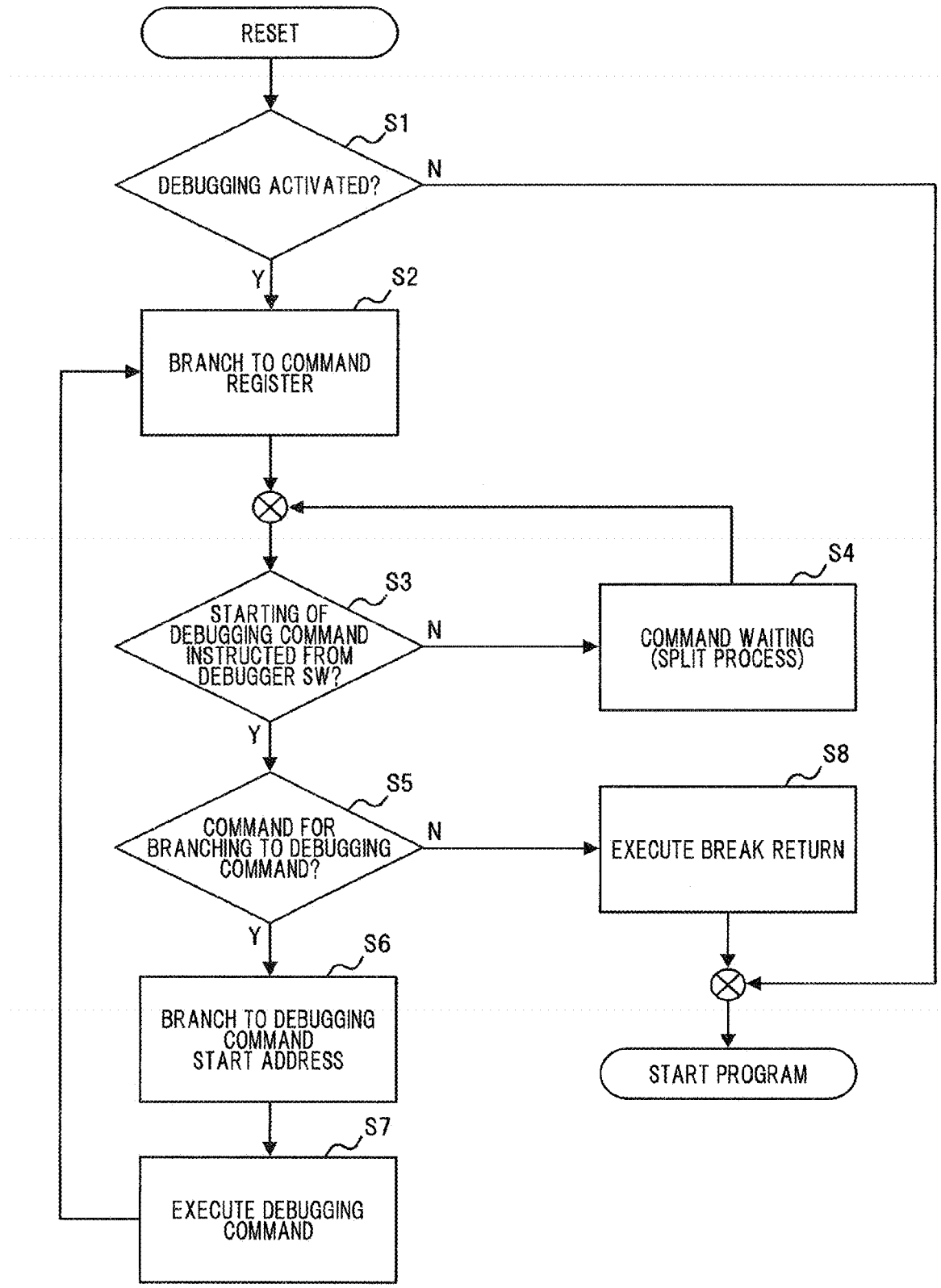
FIG. 13 is a flowchart illustrating the flow of debugging command control when a reset is released.

FIG. 13 is a flowchart illustrating the flow of debugging command control when a reset is released. In order to execute a debugging command during reset release time, the debugging may be activated, and after a reset is released, a break may occur before a user program starts. When the debugging is not activated during reset release time (NO in S1), the CPU 51 starts the normal execution of the user program. When the debugging is activated during reset release time (YES in S1), the CPU 51 branches to the command register 68 of the debugging circuit 52 (S2). In the initial state, there is no start instruction from the debugger software 45 (NO in S3). The split transaction control unit 69 notifies the bus system of the internal bus 56 and the CPU 51 of being in preparation for a response so as to make a request for the split transaction of the internal bus 56 (S4). As a result, the CPU 51 frees the bus right and enters a state of waiting for a command from the debugging circuit 52. Thereafter, in response to an instruction from the debugger software 45, the command setting control unit 62 sets a desired command in the command register 68. Furthermore, in response to the instruction from the debugger software 45, the command supply control unit 63 supplies a debugging command start instruction to the split transaction control unit 69 (YES in S3). When the supplied command is a command for branching to the debugging command start address (YES in S5), the CPU 51 branches to the debugging command start address (S6), and executes the debugging command (S7). For the debugging command completion process, the CPU 51 branches to the command register 68 (S2). When the supplied command is a break return command (NO in S5), the CPU 51 executes a break return command (S8), and starts the normal execution of the user program.

Figure 14:
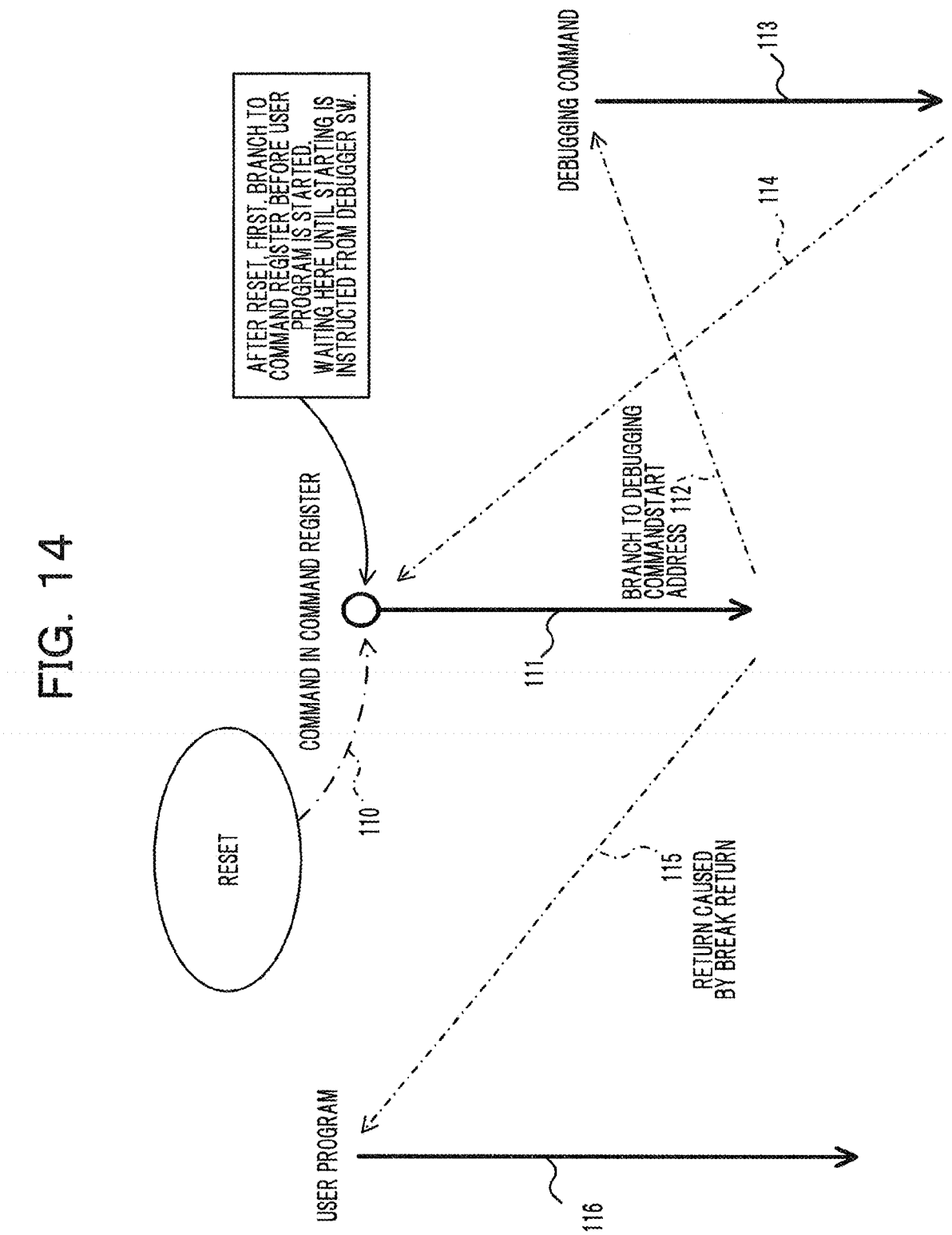
FIG. 14 illustrates the flow of command execution when debugging is activated when a reset is released.

FIG. 14 illustrates the flow of command execution when debugging is activated when a reset is released. When the reset is released and the debugging is activated, a branch 110 to the command register occurs. The command transfer control unit 61 of the debugging circuit 52 indicates being in preparation for a response with respect to the command fetching request to the command register. Thus, the CPU 51 frees the bus right without fetching a command, and enters a wait state. Thereafter, when the command transfer control unit 61 of the debugging circuit 52 indicates response preparation completion, the CPU 51 fetches a command and performs an execution 111 of the command in the command register. When the command in the command register is a debugging command start instruction command, a branch 112 to the debugging command start address occurs, and the CPU 51 performs the execution 113 of the debugging command. When the execution 113 of the debugging command is completed, a branch (return) 114 to the command register occurs. When the command in the command register is a break return command, a return 115 caused by the break return occurs, and an execution 116 of the user program is performed.

Figure 15:
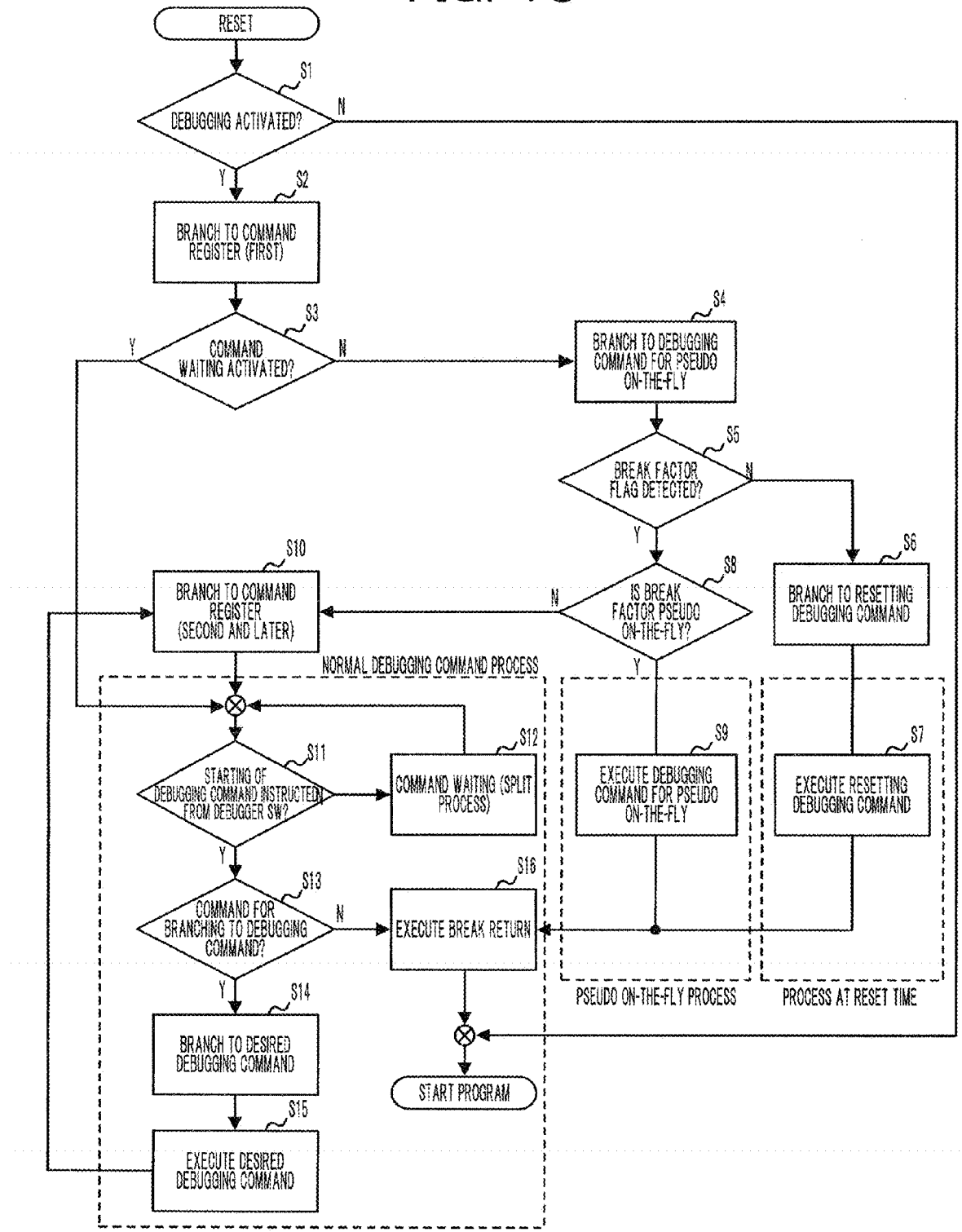
FIG. 15 is a flowchart illustrating the flow of processing of a modification of debugging command control when a reset is released.

FIG. 15 is a flowchart illustrating the flow of processing of a modification of debugging command control when a reset is released. This process is performed by the debugging system 40 illustrated in FIG. 9. When debugging is not activated during reset release time (NO in S1), the CPU 51 starts the normal execution of the user program. When the debugging is activated during reset release time (YES in S1), the CPU 51 branches to the command register 68 of the debugging circuit 52 (S2). In the initial state, a command for branching to a specific address in the memory 94 exclusively used for debugging is stored in the command register 68, and a debugging command for a pseudo on-the-fly process is stored at this specific address. When the command wait setting is not activated (NO in S3), the CPU 51 immediately reads the command in the command register 68, and branches to the debugging command start address for the pseudo on-the-fly process (S4). In the execution of the debugging command for the pseudo on-the-fly process, first, the CPU 51 detects whether or not the break factor flag has been set (S5). When the break factor flag has not been set (NO in S5), this indicates a non-ordinary break, which is immediately after a reset. The CPU 51 branches to the resetting debugging command (S6) and executes a resetting debugging command (S7). The CPU 51 executes a break return command as the command completion process (S16), and starts the execution of the user program.

When the break factor flag has been set (YES in S5), this indicates that the break is not immediately after a reset but is an ordinary break, and the CPU 51 confirms the break factor (S8). When the break factor is a pseudo on-the-fly break (YES in S8), the CPU 51 directly executes the debugging command for the pseudo on-the-fly process (S9). When the break factor is not a pseudo on-the-fly break (NO in S8), the CPU 51 branches to the command register 68 once more (S10). The subsequent processing procedure is the same as the processing procedure of FIG. 10, and accordingly, the description thereof is omitted.

Figure 16:
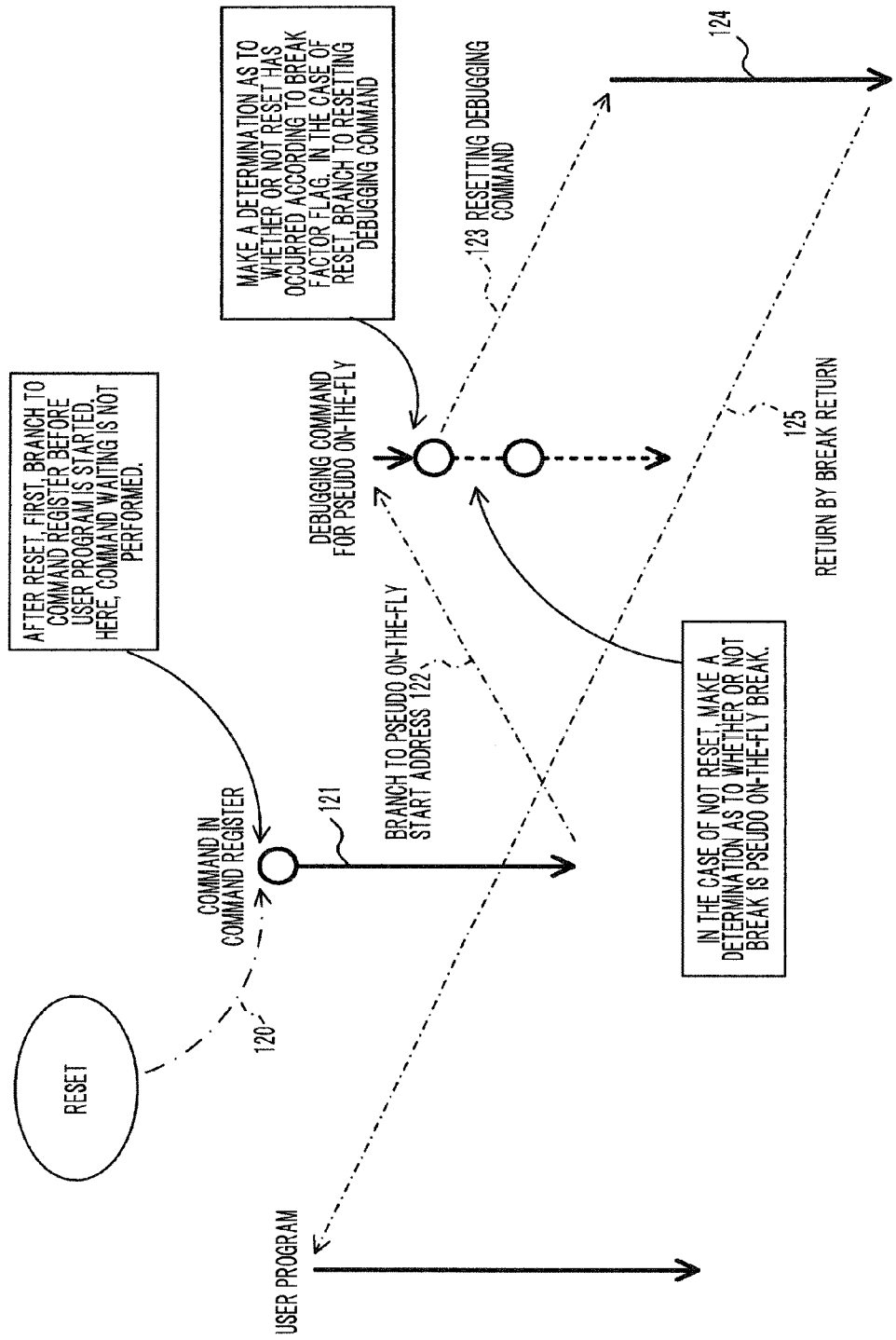
FIG. 16 illustrates an example of the flow of command execution during reset release time when command wait setting is deactivated.

FIG. 16 illustrates an example of the flow of command execution during reset release time when command wait setting is deactivated. When a reset is released and debugging is activated, a branch 120 to the command register occurs. Since the command wait setting is deactivated, the CPU 51 immediately reads the command in the command register 68, and performs an execution 121 of the command in the command register. Since the command in the command register is a command for branching to the pseudo on-the-fly start address, a branch 122 to the pseudo on-the-fly start address occurs. In the execution of the debugging command for pseudo on-the-fly, the presence or absence of the occurrence of a reset is determined according to the presence or absence of the setting of the break factor flag. When the occurrence of a reset is determined, a branch 123 to the resetting debugging command occurs, and the CPU 51 performs an execution 124 of the resetting debugging command. When the execution 124 of the resetting debugging command is completed, a return 125 caused by the break return occurs, and the execution of the user program is started. When not immediately after a reset, in the determination while the debugging command for pseudo on-the-fly is being executed, a certain break factor is detected in the break factor flag. The processing in this case is the same as the processing described with reference to FIGS. 11 and 12.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An apparatus comprising:
   a command register to store a command; and
   a control circuit to:
      set a first operation mode associated with a split transaction for freeing a bus in a time period between a command transfer request and a command transfer operation and set a second operation mode in which the split transaction is not issued; and
      transfer the command to a processing unit, via the bus, in response to the command transfer request when in the second operation mode, wherein, after the processing unit executes the command and issues a subsequent command transfer request to the control circuit, the control circuit performs the split transaction when in the first and second operation modes.

2. The apparatus of claim 1, wherein the command comprises a branching command to a memory address.

3. The apparatus of claim 2, wherein, when in the second operation mode, the control circuit transfers the branching command to the processing unit in response to the command transfer request.

4. The apparatus of claim 1, wherein the control circuit receives the command transfer request when the processing unit executes a break factor command in a user program.

5. The apparatus of claim 1, wherein the command comprises a debug command and the control circuit transmits the debug command to the processing unit, via the bus, during the time period.

6. The apparatus of claim 5, wherein the control circuit restarts a halted user program executed by the processing unit after execution of the debug command.

7. A method comprising:
storing a command in a command register;
setting, with a control circuit, a first operation mode associated with a split transaction for freeing a bus in a time period between a command transfer request and a command transfer operation;
setting, with the control circuit, a second operation mode in which a split transaction is not issued; and
transferring, with the control circuit, the command to a processing unit, via the bus, in response to the command transfer request when in the second operation mode, wherein, after the processing unit executes the command and issues a subsequent command transfer request to the control circuit, the control circuit performs the split transaction when in the first and second operation modes.

8. The method of claim 7, further comprising:
receiving the command transfer request when the processing unit executes a break factor command in a user program.

9. The method of claim 7, wherein the storing comprises storing a branching command to a memory address.

10. The method of claim 9, wherein setting the second operation mode comprises transferring the branching command to the processing unit in response to the command transfer request.

11. The method of claim 7, wherein the command comprises a debug command, and wherein the transferring comprises transmitting the debug command to the processing unit, via the bus, during the time period.

12. The method of claim 7, wherein the command comprises a debug command, and the method further comprising:
restarting a halted user program executed by the processing unit after execution of the debug command.

13. A system comprising:
a bus;
a processing unit; and
a debug circuit comprising:
a command register to store a command; and
a control circuit to:
set a first operation mode associated with a split transaction for freeing the bus in a time period between a command transfer request and a command transfer operation and set a second operation mode in which a split transaction is not issued; and
transfer the command to a processing unit, via the bus, in response to the command transfer request when in the second operation mode, wherein, after the processing unit executes the command and issues a subsequent command transfer request to the control circuit, the control circuit performs the split transaction when in the first and second operation modes.

14. The system of claim 13, wherein the command comprises a branching command to a memory address.

15. The system of claim 14, wherein, when in the second operation mode, the control circuit transfers the branching command to the processing unit in response to the command transfer request.

16. The system of claim 13, wherein the control circuit receives the command transfer request when the processing unit executes a break factor command in a user program.

17. The system of claim 13, wherein the command comprises a debug command and the control circuit transmits the debug command to the processing unit, via the bus, during the time period.

18. The system of claim 17, wherein the control circuit is restarts a halted user program executed by the processing unit after execution of the debug command.

19. An integrated circuit comprising:
a bus;
a processing unit to execute a user program; and
a debugging circuit coupled to the bus, the debugging circuit comprising a command register,
wherein, when the processing unit executes a command including a break factor in the user program,
the processing unit to halt the execution of the user program and issue a command transfer request to the debugging circuit,
the debugging circuit to perform a split response for freeing a use right of the bus from the processing unit,
the processing unit to free the use right of the bus and enter a wait state,
the debugging circuit to prepare a debugging command in the command register and transfer the debugging command to the processing unit via the bus, and
the processing unit to restart the execution of the halted user program after execution of the debugging command,
wherein the debugging circuit to be set in one of a first operation mode in which the split response is made and a second operation mode in which the split response is not made,
in an initial state, a command for branching to a specific address is to be stored in the command register of the debugging circuit,
when the debugging circuit is set in the second operation mode, the debugging circuit to immediately transfer the command for branching to the specific address to the processing unit in response to the command transfer request, and
wherein after the processing unit executes the command for branching to the specific address and a command that begins from the specific address, and issues a subsequent command transfer request to the debugging circuit, the debugging circuit to perform the split response even when the debugging circuit is set in the second operation mode.

20. A debugging command control method for use with an integrated circuit, the method comprising:
a bus,
a processing unit to execute a user program, and
a debugging circuit coupled to the bus, the debugging circuit to transfer a command to the processing unit via the bus in response to a command transfer request from the processing unit, the debugging command control method comprising:
halting the execution of the user program and transmitting the command transfer request from the processing unit to the debugging circuit;

sending, in response to the command transfer request, a split response from the debugging circuit to the processing unit for freeing a use right of the bus from the processing unit;

freeing the use right of the bus from the processing unit in response to the split response;

preparing a debugging command in the command register and transferring the debugging command to the processing unit via the bus;

executing the halted user program after executing the debugging command;

operating the debugging circuit in one of a first operation mode in which the split response is made and a second operation mode in which the split response is not made;

in an initial state, storing a command for branching to a specific address in the command register of the debugging circuit;

when the debugging circuit is set in the second operation mode, the debugging circuit to immediately transfer the command for branching to the specific address to the processing unit in response to the command transfer request; and after the processing unit executes the command for branching to the specific address and a command that begins from the specific address, and issues a subsequent command transfer request to the debugging circuit, the debugging circuit to perform the split response even when the debugging circuit is set in the second operation mode.

* * * * *